United States Patent
Sengupta

(10) Patent No.: US 11,999,019 B2
(45) Date of Patent: Jun. 4, 2024

(54) ALUMINUM-BASED WELDING ELECTRODES

(71) Applicant: Lincoln Global, Inc., Santa Fe Springs, CA (US)

(72) Inventor: Vivek Sengupta, Toronto (CA)

(73) Assignee: LINCOLN GLOBAL, INC., Santa Fa Springs, CA (US)

( * ) Notice: Subject to any disclaimer, the term of this patent is extended or adjusted under 35 U.S.C. 154(b) by 219 days.

(21) Appl. No.: 17/464,535

(22) Filed: Sep. 1, 2021

(65) Prior Publication Data

US 2022/0088724 A1     Mar. 24, 2022

Related U.S. Application Data

(60) Provisional application No. 63/090,867, filed on Oct. 13, 2020, provisional application No. 63/081,623, filed on Sep. 22, 2020.

(51) Int. Cl.
| | | |
|---|---|---|
| *B23K 35/28* | (2006.01) | |
| *B23K 35/02* | (2006.01) | |
| *C22C 21/00* | (2006.01) | |

(52) U.S. Cl.
CPC ........ *B23K 35/286* (2013.01); *B23K 35/0261* (2013.01); *C22C 21/00* (2013.01)

(58) Field of Classification Search
None
See application file for complete search history.

(56) References Cited

U.S. PATENT DOCUMENTS

| | | |
|---|---|---|
| 3,440,712 A | 4/1969 | Stroup et al. |
| 3,771,214 A | 11/1973 | Binger et al. |
| 5,597,529 A | 1/1997 | Tack |
| 6,258,318 B1 | 7/2001 | Lenczowski et al. |
| 9,644,249 B2 | 5/2017 | Haidar |

(Continued)

FOREIGN PATENT DOCUMENTS

| | | |
|---|---|---|
| CN | 101824567 A | 9/2010 |
| CN | 106282687 A | 1/2017 |

(Continued)

OTHER PUBLICATIONS

Extended European Search Report dated Feb. 11, 2022 in Application No. 21198276.4 in 9 pages.

(Continued)

*Primary Examiner* — Daniel J. Schleis
(74) *Attorney, Agent, or Firm* — Knobbe, Martens, Olson & Bear, LLP

(57) ABSTRACT

The disclosed technology relates generally to welding, and more particularly to consumable electrodes based on aluminum and methods of welding using the same. In one aspect, a consumable welding electrode comprises a base metal composition comprising at least 70% by weight of aluminum and a fluidity-enhancing metal capable of forming a binary eutectic with aluminum, wherein the binary eutectic undergoes a binary eutectic solidification at a eutectic temperature of 595-660° C. The fluidity-enhancing metal is present in form and a hypoeutectic concentration of 0.05-0.5 weight % such that a solidification temperature range of a molten weld metal formed by melting the consumable welding electrode is less than 65° C.

40 Claims, 6 Drawing Sheets

(56) References Cited

U.S. PATENT DOCUMENTS

| | | | | |
|---|---|---|---|---|
| 9,770,788 | B2* | 9/2017 | Anderson | B23K 35/40 |
| 2007/0187380 | A1 | 8/2007 | Bruckner | |
| 2009/0263277 | A1 | 10/2009 | Pandey | |
| 2010/0129683 | A1* | 5/2010 | Lin | B23K 26/32 |
| | | | | 428/654 |
| 2018/0133844 | A1 | 5/2018 | Schaeffer et al. | |
| 2018/0304415 | A1 | 10/2018 | Yamayoshi et al. | |
| 2019/0210162 | A1 | 7/2019 | Berube et al. | |
| 2020/0276675 | A1 | 9/2020 | Anderson et al. | |
| 2020/0353573 | A1 | 11/2020 | Zhang et al. | |
| 2022/0097179 | A1 | 3/2022 | Sengupta | |

FOREIGN PATENT DOCUMENTS

| | | |
|---|---|---|
| CN | 105345309 B | 12/2017 |
| CN | 110340565 A | 10/2019 |
| CN | 110396627 A | 11/2019 |
| CN | 110653517 A | 1/2020 |
| CN | 111203671 A | 5/2020 |
| CN | 111230356 A | 6/2020 |
| EP | 3 323 546 A1 | 5/2018 |
| JP | 6847766 B2 | 3/2021 |
| RU | 2180929 C2 | 3/2002 |
| RU | 2 237 097 C1 | 9/2004 |
| RU | 2 265 674 C1 | 12/2005 |
| RU | 2663446 C1 | 8/2018 |
| WO | WO 2011/090451 A1 | 7/2011 |

OTHER PUBLICATIONS

Adak et al., "Development of a Direct Correlation of Bead Geometry, Grain Size and HAZ Width with the GMAW Process Parameters on Bead-on-plate Welds of Mild Steel", Trans Indian Inst Met, © The Indian Institute of Metals—IIM 2015, Published online: Mar. 4, 2015, 12 pages.

"Aluminum GMAW—Gas Metal Arc Welding for Aluminum Guide", Publication C8.100, Issue Date Jan. 2016 © The Lincoln Electric Co., 70 pages.

"Arc Welding of Nonferrous Metals", KOBELCO, © 2015 by Kobe Steel, Ltd., 83 pages.

Armao, F., "How to recognize, minimize weld smut", Aluminum Workshop, Practical Welding Today, Mar./Apr. 2003, pp. 40-41.

"Causes of common problems encountered during welding of aluminium", Source: http://nptel.ac.in/courses/112107090/38, Available from: Nov. 18, 2013, 10 pages.

Di Sabatino, M., "Fluidity of Aluminum Foundry Alloys", Norwegian University of Science and Technology (NTNU), Trondheim, Sep. 2005, IMT-Report 2005:76, 162 pages.

Di Sabatino, M., "On Fluidity of Aluminum Alloys", La Metallurgia Italiana, vol. 100, No. 3, pp. 17-22 (2008).

Ha et al., "Effect of CaO on Oxidation Resistance and Microstructure of Pure Mg", Materials Transactions, vol. 49, No. 5 (2008) pp. 1081-1083.

Jang et al., "Effect of CaO on AZ31 Mg Strip Castings", Materials Transactions, vol. 49, No. 5 (2008) pp. 976-979.

Kang et al., "Arc Fusion Welding of Mg—Al2Ca-Added Al 5xxx Alloys", Defect and Diffusion Forum, vol. 371, No. 1662-9507, Online: Feb. 23, 2017, pp. 25-30.

Kang et al., "Gas Metal Arc Welding Using Novel CaO-Added Mg Alloy Filler Wire", Metals, 2016, vol. 6, No. 155, 8 pages.

Kawabata et al., "Effect of Calcium on the Combustion Behavior of Molten AZ91 Magnesium Alloy", Materials Transactions, vol. 59, No. 2 (2018) pp. 272-279.

Reddy, A.C., "Fluidity and Microstructural features of Al-alloy Weld Beads", Engineering Advances—Mar. 2003, pp. 28-32.

Ryan, E.M., "On Wire and Arc Additive Manufacture of Aluminium", University of Surrey, Sep. 2018, 157 pages.

Zhang Xin et al., "Influence of Rare Earth (Ce and La) Addition on the Performance of Al-3.0 wt% MgAlloy," Journal of Wuhan University of Technology-Mater Sci Ed., www.jwutms.net Jun. 2017 (Year 2017).

* cited by examiner

ALUMINUM-BASED WELDING ELECTRODES

CROSS-REFERENCE TO RELATED APPLICATIONS

This application claims the benefit of priority to U.S. Provisional Patent Application No. 63/081,623, filed Sep. 22, 2020, entitled "ALUMINUM-BASED WELDING ELECTRODES," and to U.S. Provisional Patent Application No. 63/090,867, filed Oct. 13, 2020, entitled "ALUMINUM-BASED WELDING ELECTRODES," the contents of which are hereby incorporated by reference herein in their entireties.

BACKGROUND

Field

The disclosed technology relates generally to welding, and more particularly to consumable electrodes based on aluminum and methods of welding using the same.

Description of the Related Art

The engineering use of aluminum and alloys thereof continues to increase because of the various advantageous properties of this unique material. The advantageous features of aluminum and its alloys include light weight, a relatively wide range of tunable strength properties, excellent corrosion resistance, thermal conductivity, reflectivity and widely available shapes and compositions, to name a few. Owing to these and other properties, aluminum can be an excellent choice for many applications from aerospace to heat exchangers, trailer fabrication and, most recently, automotive body panels and frames. However, welding aluminum can pose unique challenges including suppressing weld defects and improving the performance of the weld metal.

SUMMARY

In one aspect, a consumable welding electrode comprises a base metal composition comprising at least 70% by weight of aluminum and a fluidity-enhancing metal capable of forming a binary eutectic with aluminum, wherein the binary eutectic undergoes a binary eutectic solidification at a eutectic temperature of 595-660° C. The fluidity-enhancing metal is present in form and a hypoeutectic concentration of 0.05-0.5 weight % such that a solidification temperature range of a molten weld metal formed by melting the consumable welding electrode is less than 65° C.

In another aspect, a consumable welding electrode comprises a base metal composition comprising at least 70% by weight of aluminum and a fluidity-enhancing metal capable of forming a binary eutectic with aluminum, wherein the binary eutectic undergoes a binary eutectic solidification at a eutectic temperature of 595-660° C. The fluidity-enhancing metal is present in the form of a compound selected from an oxide, a halide, a hydroxide, a sulfide, a sulfate, a carbonate, a phosphate, a nitride, a nitrite, a nitride, a carbide, a boride, an aluminide, a telluride or a combination thereof.

In another aspect, a consumable welding electrode comprises a base metal composition comprising at least 70% by weight of aluminum and a fluidity-enhancing metal capable of forming a binary eutectic with aluminum, wherein the binary eutectic undergoes a binary eutectic solidification at a eutectic temperature of 595-660° C. The fluidity-enhancing metal is present in form and a hypoeutectic concentration such that a molten weld metal formed from the consumable welding electrode has a fluidity that is higher by at least 5% relative to a molten weld metal formed under substantially the same welding conditions using a consumable welding electrode that has the same base metal composition without the fluidity-enhancing metal.

In another aspect, a consumable welding electrode comprises a base metal composition comprising at least 70% by weight of aluminum, and a fluidity-enhancing metal capable of forming a binary eutectic composition with aluminum, wherein the binary eutectic composition undergoes a binary eutectic solidification at a eutectic temperature lower than a melting temperature of pure aluminum by less than 90° C., wherein the fluidity-enhancing metal is present in form and an amount such that a weld metal formed from the consumable welding electrode has one or more of the following, relative to a weld metal formed under substantially the same welding conditions using the consumable welding electrode without the fluidity-enhancing metal:
a weld metal height (H) that is lower by at least 5%,
a weld metal width (W) that is higher by at least 5%,
a H/W ratio that is lower by at least 5%,
a penetration (P) that is lower by at least 5%, and
a weld toe angle (q) that is lower by at least 5%.

In one aspect, a consumable welding electrode comprises a base metal composition comprising at least 70% by weight of aluminum and a fluidity-enhancing metal capable of forming a binary eutectic composition with aluminum, wherein the binary eutectic composition undergoes a binary eutectic solidification at a eutectic temperature lower than a melting temperature of pure aluminum by less than 90° C. The fluidity-enhancing metal is present in form and an amount such that a molten weld metal formed from the consumable welding electrode has a fluidity that is higher by at least 5% relative to a molten weld metal formed under substantially the same welding conditions using the consumable welding electrode without the fluidity-enhancing metal.

In another aspect, a consumable welding electrode comprises a base metal composition comprising at least 70% by weight of aluminum and a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd), lithium (Li), iron (Fe), cadmium (Cd) or a combination thereof. The fluidity-enhancing metal is present in an amount greater than 0.05% and less than or equal to a binary eutectic composition by weight on the basis of a combined weight of aluminum and the fluidity enhancing metal.

In another aspect, a consumable welding electrode comprises a base metal composition comprising at least 70% by weight of aluminum, and a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd), lithium (Li), iron (Fe), cadmium (Cd) or a combination thereof. The fluidity-enhancing metal is present in form and an amount such that a molten weld metal formed from the consumable welding electrode has a fluidity that is higher by at least 5% relative to a molten weld metal formed under substantially the same welding conditions using the consumable welding electrode without the fluidity-enhancing metal.

In another aspect, a consumable welding electrode comprises a base metal composition comprising at least 70% by weight of aluminum, and a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd), lithium (Li), iron (Fe), cadmium (Cd) or a combination thereof, wherein the fluidity-enhancing metal is present in form and an amount such that a weld metal formed from the consumable welding electrode has one or more of the following relative to a weld metal formed under substantially the same welding conditions using the consumable welding electrode without the fluidity-enhancing metal:

a weld metal height (H) that is lower by at least 5%,
a weld metal width (W) that is higher by at least 5%,
a H/W ratio that is lower by at least 5%,
a penetration (P) that is lower by at least 5%, and
a weld toe angle (q) that is lower by at least 5%.

In yet another aspect, a method of welding an aluminum workpiece, comprising providing a consumable welding electrode according to any comprising an aluminum-based base metal composition and a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd), lithium (Li), iron (Fe), cadmium (Cd) or a combination thereof; and generating an arc to form a weld metal using the consumable welding electrode at a weld travel speed of 10-50 inches per minute.

DETAILED DESCRIPTION

Figure 1:
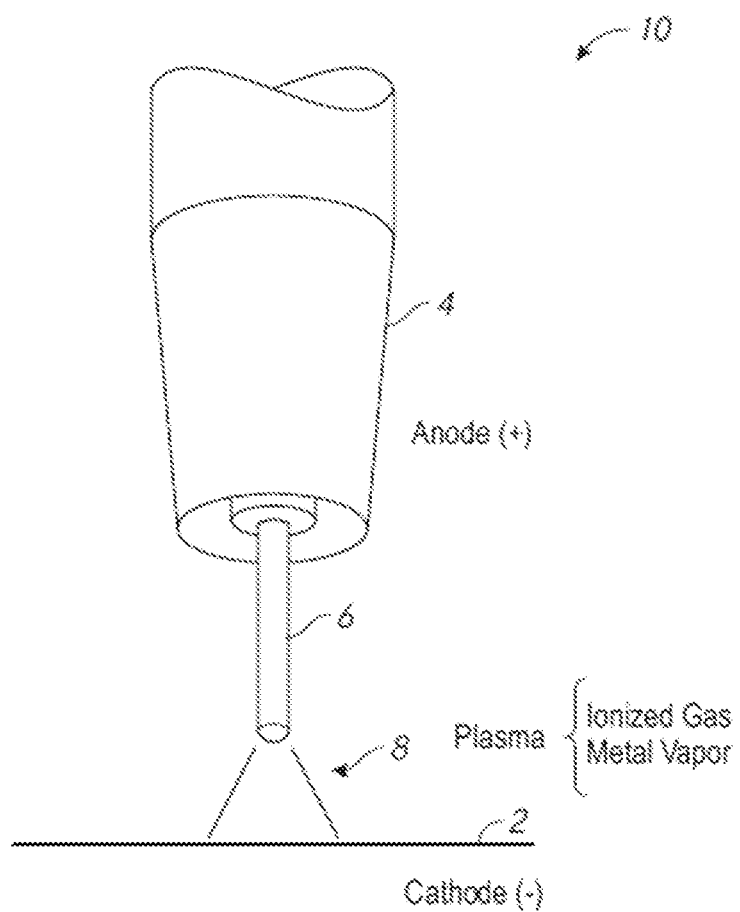
FIG. 1 is a schematic illustration of a metal arc welding process.

The weight of aluminum is about one third that of steel. A cubic inch of aluminum weighs 0.098 lbs./in$^3$ compared to steel, which weighs 0.283 lbs./in$^3$. Aluminum has a wide range of strength properties that vary from 13,000 psi tensile strength for pure aluminum up to 90,000 psi tensile strength for the strongest heat-treatable aluminum alloys. Aluminum provides excellent corrosion resistance in many environments. The thin refractory oxide that forms on the surface of aluminum provides a protective barrier. Aluminum is up to five times more thermally conductive than steel. Aluminum is reflective of radiant heat, and the surface finish of aluminum is frequently used to take advantage of this feature. Due to these and other advantageous properties of aluminum, engineering applications of aluminum continue to grow in number and complexity. Correspondingly, challenges of welding aluminum continues to grow, including suppressing weld defects and improving the properties of the weld metal. In general, aluminum is considered to have comparatively lower weldability than steels due to various reasons, including higher affinity of aluminum towards atmospheric gases, higher thermal expansion coefficient, higher thermal and electrical conductivity, lower rigidity and higher solidification temperature range, among other reasons. These characteristics of aluminum alloys in general can render welding aluminum be more prone to defect formation in the weld metal.

Many aluminum-based welding electrodes show poor molten weld metal fluidity. Among the various reasons that lower the weldability of Al, the relatively low fluidity of the molten weld metal formed from some aluminum-based welding electrodes can cause particular types of defects in the weld metal. For example, lower molten weld metal fluidity can lead to undercuts at relatively high travel speeds, poor wetting at the weld toes, higher porosity and lower penetration. The lower molten weld metal fluidity can also lead to higher porosity in the weld metal due to interdendritic porosity formation. In addition, the lower molten weld metal fluidity can result in taller weld beads, which can in turn increase the likelihood of to stress concentration at the weld toes and lead to failure in fatigue mode. In addition to causing susceptibility to these weld metal defects, because the relatively low molten weld metal fluidity can restrict controllability of the weld pool, it can in turn limit welding to slower travel speeds, which lowers productivity.

In addition, while some aluminum-based welding electrodes provide higher molten weld fluidity compared to others, e.g., 4XXX alloys, they pose a different set of challenges. For example, some elements are known to provide relatively higher molten weld fluidity, e.g., silicon. However, the weld metals formed from Al-based welding electrodes containing Si can have compromised weld shear strength. A such, electrodes based on 4XXX alloys may not be suitable for welding work pieces formed of 5XXX alloys for some applications, as brittle phases such as Mg$_2$Si phase may reduce the ductility of the weld.

Without limitation, the disclosed technology addresses these and other aspects of aluminum-based welding electrodes. In particular, the disclosed welding electrodes according to various embodiments disclosed herein include alloying elements that can increase the molten weld metal fluidity without substantially compromising some of the desirable attributes, e.g., shear strength.

Arc Welding Using Aluminum-Based Welding Wires

FIG. 1 is a schematic illustration of a configuration of an Al-based welding wire or electrode in metal arc welding processes, according to embodiments. The Al-based welding wire 6 can be configured for lower fluidity of the molten weld metal according to embodiments. In the illustrated metal arc welding, e.g., gas-metal arc welding (GMAW), an electric arc is created between a consumable Al-based welding wire 6, which is electrically connected to one electrode 4 (e.g., anode (+)), and a workpiece 2, which serves as another electrode (e.g., cathode (−)). Thereafter, a plasma 8 is sustained, which contains neutral and ionized gas molecules, as well as neutral and charged clusters or droplets of the material of the Al-based welding wire 6 that have been vaporized by the arc. During welding, the consumable welding wire 6 is advanced toward the workpiece 2, and the resulting molten weld metal droplets formed from the Al-based welding wire 6 deposit onto the workpiece, thereby forming a weld metal or bead.

The Al-based welding wire 6 can be used in various arc welding processes, including gas-metal arc welding processes, which may employ either solid electrode wires (GMAW) or metal-cored wires (GMAW-C). The Al-based welding wire 6 can also be used in flux-cored arc welding processes (FCAW), which can be gas shielded flux-cored arc welding (FCAW-G) or self-shielded flux-cored arc welding (FCAW-S). The Al-based welding wire 6 can further be used in shielded metal arc welding (SMAW) processes and submerged arc welding (SAW) processes, among others.

Aluminum-Based Welding Wire with Enhanced Fluidity of the Molten Weld Metal

To address the above noted and other challenges of aluminum welding, the welding wires according to embodiments are configured to substantially enhance the fluidity of the molten weld metal. To enhance fluidity in molten weld metal, the welding wire 6 (FIG. 1) according to embodiments comprises an Al-based base metal composition comprising at least 70% by weight of aluminum and a fluidity-enhancing metal. The base metal composition may additionally include any other element that may serve to provide the desired characteristics of the final weld metal, including elements that may overlap those present in the work piece. As discussed more infra, the inventors have discovered that effective fluidity-enhancing metals include metals capable forming a binary eutectic with aluminum, wherein the binary eutectic undergoes a binary eutectic solidification at a eutectic temperature lower than a melting temperature of pure aluminum by less than 90° C. The fluidity-enhancing metal is present in form and an amount such that a molten weld metal formed from the consumable welding electrode has a fluidity that is higher by at least 5% relative to a molten weld metal formed using the base metal composition without the fluidity-enhancing metal. Enhancing the fluidity of the molten weld metal enhances controllability of the weld pool, which can in turn enable welding at faster travel speed, thereby improving productivity. The enhanced fluidity can also lead to improvements in the performance of the resulting weld metal, e.g., through reduction of various undesirable weld characteristics described above, including undercuts, poor wetting at the weld toes, higher porosity, lower penetration and taller weld beads.

Fluidity of Molten Weld Metal & Weld Metal Shape

As described herein and in the technology of welding, without limitation, the term fluidity as it relates to molten metal refers to metallurgical fluidity, which is a measure of the distance a molten metal can flow in a mold of a constant cross-sectional area before it solidifies. It will be appreciated that this definition is different from the definition presented in physics which describes fluidity as the inverse of viscosity, which is a fundamental temperature-related property of a liquid.

As described herein, unless the description of molten weld metal as disclosed herein is inconsistent under either of the definitions, the term fluidity shall encompass both metallurgical and physics definitions. However, if the description of molten weld metal as disclosed herein is inconsistent under either of the definitions, the term fluidity shall refer to one of the metallurgical and physics definitions that does not render the description inconsistent.

A number of methods can be employed to measure the fluidity of molten metals. Common to many measurement techniques is flowing the molten metal into a narrow channel. Fluidity is reported as a measure of the length or volume of the mold filled by the metal stream before it freezes. Fluidity testing can be carried out in different ways. Among the most popular fluidity tests are the spiral-shaped mold test and the vacuum fluidity test. The former test measures the length the molten metal flows inside a spiral-shaped mold. The latter test measures the length the metal flows inside a narrow channel when sucked from a crucible by using a vacuum pump. These and other methods are disclosed in M. Di Sabatino, "Fluidity of Aluminium Foundry Alloys," Ph.D. Thesis submitted to Norwegian University of Science and Technology (2005) and "On Fluidity of Aluminum Alloys," La Metallurgia Italiana 100 (3): 17-22 (2008), the content of each of which is incorporated by reference it its entirety.

As described herein, unless the description of the fluidity of molten weld metal as disclosed herein is inconsistent when measured using any of the tests described above, the described fluidity shall refer to that which is measured using any and all of the tests described above. However, if the description of the fluidity of molten weld metal as disclosed herein is inconsistent under any of test methods described above, the described fluidity shall refer to that which is measured using any of the tests described above that gives rise to results that are consistent with the description.

The fluidity of the weld metal is affected to multiple factors, including thermodynamic parameters such as the chemical composition of the molten weld metal, the solidification range and heat of fusion, as well as physical parameters such as viscosity and surface tension, to name a few. In particular, the dynamics of solidification of the weld plays an important role in determining the fluidity of the weld. The solidification of the weld is in turn governed to a large extent by the weld composition and the thermodynamics resulting therefrom, as described further infra.

Figure 2:
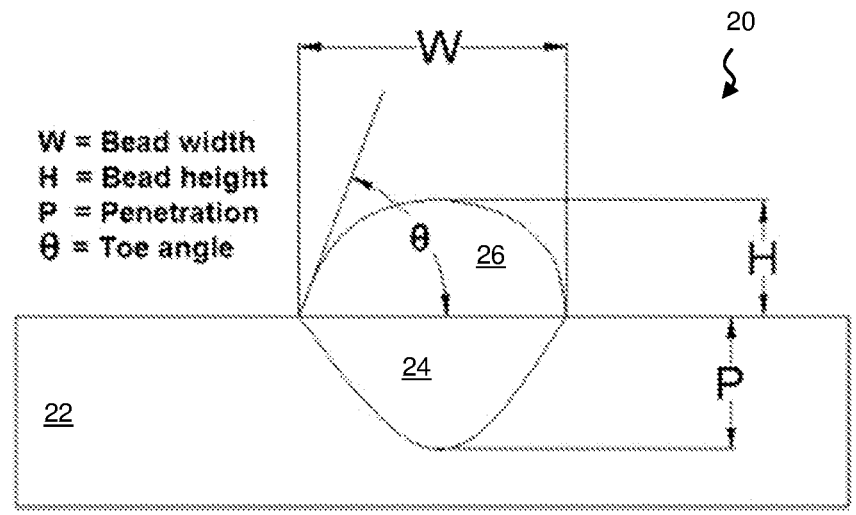
FIG. 2 is a schematic cross-sectional view of a weld bead.

The weld fluidity can directly affect the shape of the resulting weld metal, as schematically illustrated in FIG. 2. FIG. 2 is a schematic cross-sectional view of a weld metal bead 26 formed on a workpiece or substrate 22, and a heat affected zone or a penetration zone 24 having a depth into the workpiece 22. As described herein, the weld metal 26 can be characterized by a bead height (H), a bead width (W) a depth of penetration (P) and a toe angle (θ). The H and P are measured in a vertical direction away from the plane of the major surface of the workpiece 22. The W is measured in a lateral direction along the plane of the major surface of the workpiece 22. The q is measured between the plane of the major surface of the workpiece 22 and a line of tangent at the base of the weld metal 26. As discussed above, for many applications, a higher fluidity of the molten weld metal may be desired, which in turn results one more of a lower H, higher W, lower H/L ratio, a higher P and a smaller θ.

It will be appreciated that, by varying several process parameters, different bead profiles can be achieved for a given composition. For example, an increase in the H, W and/or H/W may be obtained with increasing wire feed speed (WFS) at a particular arc voltage and contact tip to workpiece distance (CTWD). At constant WFS, the H may increase and/or the W may decrease with decrease in arc voltage. In addition to the process parameters, because the shape of the weld metal depends on many extrinsic factors such as the composition, shape and surface condition of the workpiece, a person having ordinary skill in the art will appreciate that the most meaningful measurement of an improvement in the fluidity of a molten weld metal formed from a welding electrode having a fluidity-enhancing metal present therein can be made when the thus formed weld metal is compared to a weld metal formed under substantially the same welding conditions using a consumable welding electrode that has the same base metal composition but without the fluidity-enhancing metal.

Composition and Thermodynamic Characteristics of Fluidity-Enhanced Weld Metal

For a pure metal or a eutectic alloy, the solidification takes place at a single temperature. In the case of an alloy at a composition other than a Eutectic temperature, the solidification of the liquid mixture can take place over a range of temperatures. Over this range of temperatures, precipitation of one or more phases can occur. The inventors have discovered that the precipitation can result in formation of a "mushy" zone including a slurry-like mixture of liquid and precipitates between the solidifying weld metal and the fusion line. Without being bound to any theory, the precipitates formed during solidification can serve as nucleation sites for new grains, which can limit the fluidity of the molten weld metal. The inventors have discovered that, by adding certain fluidity-enhancing metal having a relatively small range of temperatures over which the "mushy" zone can form as alloying elements, the fluidity of the molten weld metal can be substantially enhanced, as described herein.

Figure 3A:
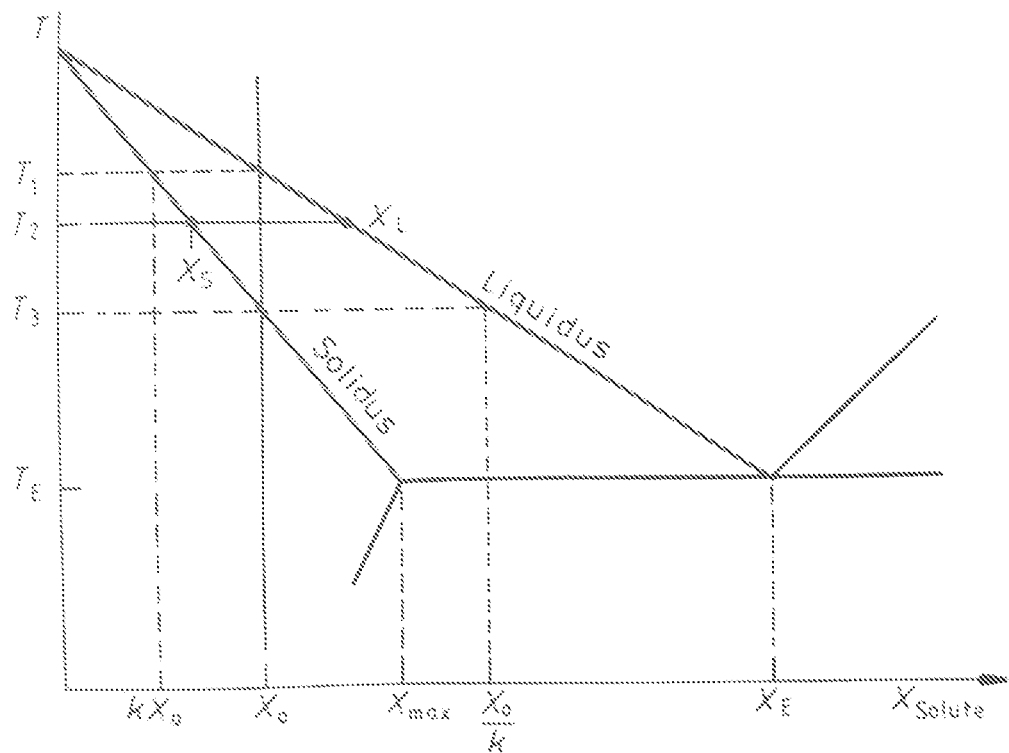
FIG. 3A is an idealized binary phase diagram of an alloy for illustration of a solidification temperature range of an alloy having a binary eutectic.

FIG. 3A is a schematic idealized binary phase diagram, for illustrative purposes only, of a hypothetical alloy that undergoes solidification. It will be appreciated that, while solidification of a weld metal may deviate significantly from equilibrium conditions, an equilibrium phase diagram nevertheless provides valuable insight into the solidification process. The x and y axes represent the concentration of an alloying element or solute and temperature, respectively. It will be appreciated that, while the illustrated phase diagram has been idealized by assuming that the solidus and liquidus are straight lines, actual alloy systems can have curved solidus and liquidus. The composition $X_{max}$ denotes the maximum content of the alloying element or solute for solidification of the binary alloy as a single phase alloy. A partition coefficient k can be defined by $X_S/X_L$, where $X_S$ and $X_L$ are mole fractions of the solute in the solid and liquid is equilibrium at a given temperature. The solidification process depends in rather a complex way on various factors such as temperature gradients, cooling rates and growth rates. Under equilibrium conditions, the alloy having a composition $X_0$, begins to solidify at the temperature $T_1$, with the formation of a small amount of a solid precipitate, with a composition kX. As the temperature is lowered, e.g., at $T_2$, more solid forms, and provided cooling is slow enough to allow extensive solid state diffusion, the solid and liquid have compositions $X_S$, $X_L$, following the solidus and liquidus lines. The relative amounts of solid and liquid at any temperature are given by the lever rule. At $T_2$, the last drop of liquid will have a composition X/k and the solidified metal will have a composition X.

Referring back to FIG. 2, the solidification generally starts at the fusion line defining the depth of the penetration region 24, and the base-metal grains serve as the nucleation sites. Depending on whether the base alloy of the base metal (BM) and the filler alloy are the same or different, the grain growth near the fusion line can occur by epitaxial or non-epitaxial mechanisms, respectively. The rest of the weld metal away from the fusion line solidifies through a competitive growth mechanism, which can depend on the direction of maximum heat extraction. For a pure element, due to the absence of impurities in the weld, the weld can flow relatively freely. However, in alloys, solidification takes place over a range of temperatures, as schematically illustrated in FIG. 3A at nonzero solute concentrations. This leads to the formation of the "mushy" zone including a slurry-like mixture of liquid and precipitates between the solidifying weld metal and the fusion line that contains a mixture of liquid and solid precipitates. The precipitates formed during solidification can in turn serve as nucleation sites for new grains which can obstruct the flow of the weld. For example, relatively poor weld fluidity observed in weld metals formed from welding electrodes formed of Al—Mg alloys can be attributed in part to a large solidification range. The inventors have discovered that, by adding the fluidity-enhancing elements that have a relatively small range of temperatures over which the "mushy" zone can form, the formation of the precipitates that impede the flow of the molten weld metal can be reduced, thereby substantially enhancing the fluidity of the molten weld metal.

Once a pure element is alloyed with another element, the fluidity initially decreases up to a point. Then the fluidity starts increasing until the eutectic composition is reached and then again starts decreasing beyond the eutectic composition. Al—Si alloys are an exception, in which the fluidity increases beyond the eutectic composition (12.5 wt. % Si). Si has 4.5 times higher heat of fusion than Al; this extra heat can keep the weld fluid. In the case of Al—Mg alloys, fluidity drops drastically from pure Al levels with the introduction of Mg until 2 wt. % Mg; then, it increases to till the eutectic composition (~33 wt. % Mg).

In recognition of these attributes of weld metal fluidity, the inventors have discovered that addition of certain fluidity-enhancing elements in certain effective amount as part of the welding wire can substantially increase the fluidity. According to various embodiments, the consumable welding electrode comprises a base metal composition comprising at least 70% by weight of aluminum and a fluidity-enhancing metal.

The base metal composition can have a composition that is similar to the workpiece to be welded. The base metal composition can include any composition that is known in the art according to a system of four-digit numbers that have been developed by the Aluminum Association, Inc., to designate the various wrought aluminum alloy types. The base metal composition can include one or more of, e.g.:

1XXX series: These are aluminums of 99 percent or higher purity which are used primarily in the electrical and chemical industries. These alloys are usually used for their electrical conductivity and/or corrosion resistance. Their sensitivity to hot cracking is very low.

2XXX series. Copper is the principal alloy in this group, which provides extremely high strength when properly heat treated. These alloys may not produce as good corrosion resistance and are often clad with pure aluminum or special-alloy aluminum. These alloys are used in the aircraft industry.

3XXX series. Manganese is the major alloying element in this group, which is non-heat-treatable. Manganese content can be less than about 2.0 percent. These alloys have moderate strength and can be easily worked. These moderate strength aluminum-manganese alloys are relatively crack resistant.

4XXX series. Silicon is the major alloying element in this group. It can be added in sufficient quantities to substantially reduce the melting point and is used for brazing alloys and welding electrodes. Most of the alloys in this group are non-heat-treatable.

5XXX series. Magnesium is the major alloying element of this group, which are alloys of medium strength. They possess good welding characteristics and good resistance to corrosion, but the amount of cold work should be limited. These higher strength aluminum-magnesium alloys are the most common structural aluminum sheet and plate alloys. This series has the highest strength of the non heat-treatable aluminum alloys. They are used in chemical storage tanks and pressure vessels as well as structural applications, railway cars, dump trucks and bridges, because of its superior corrosion resistance.

6XXX series. Alloys in this group contain silicon and magnesium, which make them heat treatable. These alloys possess medium strength and good corrosion resistance. This medium strength, heat-treatable series is primarily used in automotive, pipe, railings and structural extrusion applications.

7XXX series. Zinc is the major alloying element in this group. Magnesium is also included in most of these alloys. Together, they form a heat-treatable alloy of very high strength, which is used for aircraft frames. It is primarily used in the aircraft industry. The weldability of the 7XXX series may be compromised in higher copper grades, as many of these grades are crack sensitive due to wide melting ranges and low solidus melting temperatures. They are widely used for bicycle frames and other extruded application.

The base metal composition of the welding wires according to various embodiments disclosed herein can include Mn in a weight percentage of, on the basis the total weight of the welding wire, 0.01-0.02%, 0.02-0.05%, 0.05-0.10%, 0.1-0.2%, 0.2-0.5%, 0.5-1.0%, 1.0-1.5%, 1.5-2.0%, or a value in a range defined by any of these values; Si in a weight percentage of, on the basis the total weight of the welding wire, 0.1-0.2%, 0.2-0.5%, 0.5-1.0%, 1.0-2.0%, 2.0-5.0%, 5.0-10%, 10-15%, 15-20%, or a value in a range defined by any of these values; Fe in a weight percentage of, on the basis of the total weight of the welding wire, 0.02-0.05%, 0.05-0.10%, 0.1-0.2%, 0.2-0.5%, 0.5-1.0%, or a value in a range defined by any of these values; Mg in a weight percentage of, on the basis the total weight of the welding wire, 0.1-0.2%, 0.2-0.5%, 0.5-1.0%, 1.0-2.0%, 2.0-5.0%, 5.0-10%, or a value in a range defined by any of these values; Cr in a weight percentage of, on the basis the total weight of the welding wire, 0.01-0.02%, 0.02-0.05%, 0.05-0.10%, 0.1-0.2%, 0.2-0.5%, 0.5-1.0%, or a value in a range defined by any of these values; Cu in a weight percentage of, on the basis the total weight of the welding wire, 0.01-0.02%, 0.02-0.05%, 0.05-0.10%, 0.1-0.2%, 0.2-0.5%, 0.5-1.0%, 1.0-2.0%, 2.0-5.0%, 5.0-10%, or a value in a range defined by any of these values; Ti in a weight percentage of, on the basis of the total weight of the welding wire, 0.02-0.05%, 0.05-0.10%, 0.1-0.2%, 0.2-0.5%, 0.5-1.0%, or a value in a range defined by any of these values; Zn in a weight percentage of, on the basis of the total weight of the welding wire, 0.05-0.10%, 0.1-0.2%, 0.2-0.5%, 0.5-1.0%, or a value in a range defined by any of these values; and Al in a weight percentage of, on the basis of the total weight of the welding wire, 70-75%, 70-75%, 75-80%, 80-85%, 85-90%, 90-95%, 95-99.9%, or a value in a range defined by any of these values, which can be the balance of the welding wire or the base metal composition.

According to various embodiments, the consumable welding electrode comprises a the fluidity-enhancing metal that is present in form and an amount such that a molten weld metal formed from the consumable welding electrode has a fluidity that is higher by at least 5%, 10%, 20%, 50%, 100%, 200%, 500%, 1000%, or a value in range defined by any of these values, relative to a molten weld metal formed under substantially the same welding conditions using a consumable welding electrode having the same composition except for the fluidity-enhancing metal.

As described above, post-deposition characterization of the solidified weld metal can also provide indications of the fluidity of the molten weld metal. Referring back to FIG. 2, weld metal fluidity can be inferred based on the weld metal shape factors, such as the height, width, height/width ratio and/or weld toe angle. According to various embodiments, the fluidity-enhancing metal is present in form and an amount such that a weld metal formed from the consumable welding electrode has one or more of the following characteristics relative to a weld metal formed under substantially the same welding conditions using a consumable welding electrode having the same composition except for the fluidity-enhancing metal: a weld metal height (H) that is lower by at least 5%, 50%, 100%, 150%, 200%, 250%, 300% or a value in a range defined by any of these values; a weld metal width (W) that is higher by at least 5%, 20%, 40%, 60%, 80%, 100% or a value in a range defined by any of these values; a H/W ratio that is lower by at least 5%, 50%, 100%, 150%, 200%, 250%, 300% or a value in a range defined by any of these values; a penetration (P) that is lower by at least 5%, 20%, 40%, 60%, 80%, 100% or a value in a range defined by any of these values; and a weld toe angle ($\theta$) that is lower by at least 5%, 20%, 40%, 60%, 80%, 100% or a value in a range defined by any of these values.

As discussed above, the inventors have discovered that a property of an effective fluidity-enhancing element is the capability of forming a binary eutectic composition with aluminum with a relatively low temperature range within which a "mushy" zone is formed, as described above. A physical parameter that is indicative of this temperature range is the solidification temperature range. Thus, the inventors have discovered that one of the desirable physical attributes of an effective fluidity-enhancing element is a relatively narrow solidification temperature range within a relevant composition range. The solidification temperature range can be defined as the temperature range between the liquidus and solidus. Referring back to FIG. 3, the solidification temperature range for the composition $X_0$ is $T_3$-$T_1$. The inventors have further realized that an alloy system having a relatively narrow solidification temperature range according to embodiments forms a binary eutectic composition that undergoes a binary eutectic solidification at a eutectic temperature that is within a relatively close proximity to the melting temperature of pure aluminum.

Figure 3B:
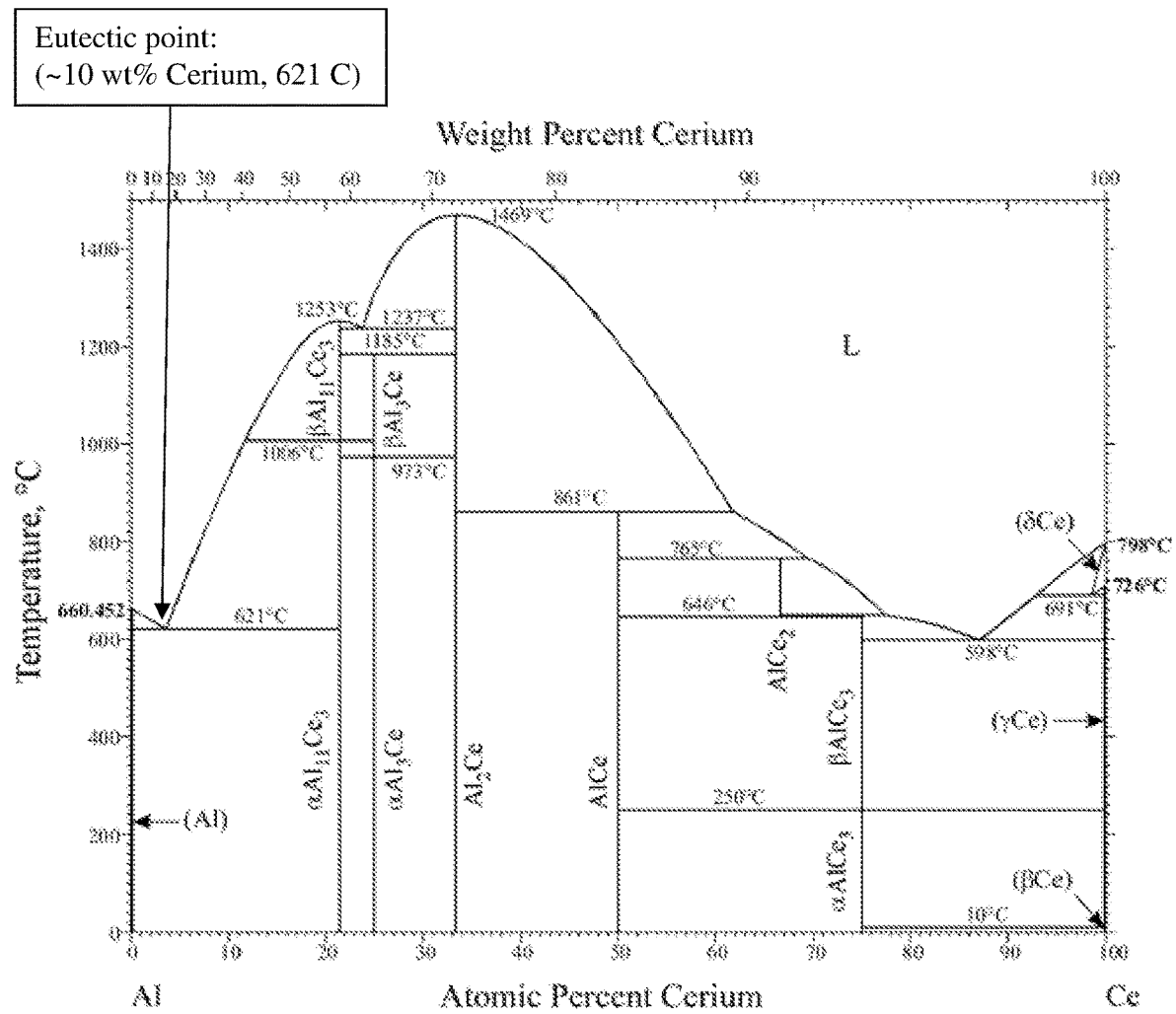
FIG. 3B is a binary phase diagram of the Al—Ce alloy system.

Referring back to FIG. 3A, for the idealized binary alloy system, it will be appreciated that the maximum value of the solidification temperature range does not exceed the difference between the melting temperature the pure metal and the eutectic temperature $T_E$. As such, the eutectic temperature can be a selection criterion for the fluidity-enhancing metal. According to various embodiments, the fluidity-enhancing metal forms a binary eutectic composition at a temperature lower than a melting temperature of pure aluminum by less than 90° C., 80° C., 70° C., 60° C., 50° C., 40° C., 30° C., 20° C., 10° C., or less than a value in range defined by any of these values. For a condition under which the melting temperature of aluminum is 660° C., the binary eutectic composition melts at a melting temperature of less than 570° C., 580° C., 590° C., 600° C., 610° C., 620° C., 630° C., 640° C., 650° C., 660° C., or less than a value in range defined by any of these values. For instance, a fluidity-enhancing metal capable of forming a binary eutectic with aluminum according to embodiments undergoes a binary eutectic solidification at a eutectic temperature of 595-660° C. For illustrative purposes, one example alloy system having these attributed is the Al—Ce alloy system, a binary phase diagram of which is illustrated in FIG. 3B. As illustrated, the Eutectic temperature of 621° C. is within the range of 595-660° C.

TABLE 1 below shows approximate maximum solidification temperature ranges for some example fluidity-enhancing elements, according to embodiments. TABLE 2 below shows eutectic temperatures and eutectic compositions and composition ranges for some example fluidity-enhancing elements within which the fluidity of the molten weld metal can be enhanced.

TABLE 1

| Relevant Alloy Systems | Max Solidification/Freezing Range in Hypoeutectic Alloys (° C.) |
|---|---|
| Al-Ni system | ~20 |
| Al-Au system | ~10 |
| Al-Ca system | ~50 |
| Al-Ce system | ~40 |
| Al-Er system | ~10 |
| Al-Dy system | ~10 |
| Al-Eu system | ~30 |
| Al-Lu system | ~40 |
| Al-Nd system | ~30 |
| Al-Pr system | ~20 |
| Al-Sm system | ~40 |
| Al-Sr system | ~10 |
| Al-Ni system | ~65 |
| Al-Fe-system | ~5 |
| Al-Cd system | ~10 |

TABLE 2

| Relevant Alloy Systems | Eutectic Temperature (° C.) | Eutectic Composition (% wt. solute) | Relevant Composition Range (% wt. solute) |
|---|---|---|---|
| Al-Ni system | 642 | ~9% | 0.05-9% |
| Al-Au system | 650 | 7.5% | 0.05-7.5% |
| Al-Ca system | 613 | ~9% | 0.05-9% |
| Al-Ce system | 621 | ~10% | 0.05-10% |
| Al-Er system | 649 | ~10% | 0.05-10% |
| Al-Dy system | 635 | ~10% | 0.05-10% |
| Al-Eu system | 630 | ~6% | 0.05-6% |
| Al-Lu system | 620 | ~14% | 0.05-14% |
| Al-Nd system | 632 | ~10% | 0.05-10% |
| Al-Pr system | 640 | ~10% | 0.05-10% |
| Al-Sm system | 635 | ~10% | 0.05-10% |
| Al-Sr system | 650 | ~2% | 0.05-2% |
| Al-La system | 640 | ~10% | 0.05-10% |
| Al-Y system | 637 | ~10% | 0.05-10% |
| Al-Tb system | 634 | ~10% | 0.05-10% |
| Al-Sc system | ~660 | 0.47% | 0.05-0.47% |
| Al-Gd system | 650 | ~20% | 0.05-20% |
| Al-Tm system | 645 | ~16% | 0.05-16% |
| Al-Yb system | 625 | 20% | 0.05-20% |
| Al-Ho system | 635 | ~10% | 0.05-10% |
| Al-Ni system | 596 | 8% | 0.05-8% |
| Al-Fe-system | 655 | 1.7% | 0.05-1.7% |
| Al-Cd system | 650 | 6.95% | 0.05-6.96% |

According to one embodiment, a consumable welding electrode comprises a base metal composition comprising at least 70% by weight of aluminum and a fluidity-enhancing metal capable of forming a binary eutectic with aluminum, wherein the binary eutectic undergoes a binary eutectic solidification at a eutectic temperature of 595-660° C. The fluidity-enhancing metal according to embodiments is selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd), lithium (Li), iron (Fe), cadmium (Cd) or a combination thereof.

According to a more particular embodiment, the binary eutectic undergoes a binary eutectic solidification at a eutectic temperature >595 and <630° C. According to this embodiment, the fluidity-enhancing metal is selected from the group consisting of calcium (Ca), cerium (Ce), lutetium (Lu), ytterbium (Yb), lithium (Li) or a combination thereof.

According to another more particular embodiment, the binary eutectic undergoes a binary eutectic solidification at a eutectic temperature ≥630 and <645° C. In this embodiment, the fluidity-enhancing metal is selected from the group consisting of nickel (Ni), dysprosium (Dy), europium (Eu), yttrium (Y), terbium (Tb), holmium (Ho), lanthanum (La), praseodymium (Pr), samarium (Sm), neodymium (Nd), or a combination thereof.

According to a more particular embodiment, the binary eutectic undergoes a binary eutectic solidification at a eutectic temperature ≥645 and ≤660° C. According to this embodiment, the fluidity-enhancing metal is selected from the group consisting of gold (Au), strontium (Sr), scandium (Sc), erbium (Er), gadolinium (Gd), thulium (Tm), iron (Fe), cadmium (Cd) or a combination thereof.

According to various embodiments, the fluidity-enhancing metal is present at a hypoeutectic concentration. Referring back to FIG. 3A, the composition $X_{max}$ denotes the maximum content of the fluidity-enhancing metal at which the binary alloy solidifies as a single phase alloy.

According to some embodiments, the hypoeutectic concentration is such that the molten weld metal formed from the consumable welding electrode solidifies into a single phase having the aluminum (face-centered cubic) crystal structure. However, embodiments are not so limited and in other embodiments, the molten weld metal formed from the consumable welding electrode solidifies into multiple phases including the aluminum crystal structure and at least another phase including the fluidity-enhancing metal.

The welding wire can include one or more of these elements, on the basis the total weight of the welding wire, 0.01-0.02%, 0.02-0.05%, 0.05-0.10%, 0.1-0.2%, 0.2-0.5%, 0.5-1.0%, 1.0-1.5%. 1.5-2.0%, 2.0-2.5%, 2.5-3.0%, 3.0-

3.5%, 3.5-4.0%, 4.0-4.5%, 4.5-5.0%, or a value in a range defined by any of these values. In a particular embodiment, the fluidity-enhancing metal is present in form and a hypoeutectic concentration of 0.05-0.5 weight % such that a solidification temperature range of a molten weld metal formed by melting the consumable welding electrode is less than 65° C.

In some of these embodiments, the fluidity-enhancing metal may be present in elemental metal form. In some other of these embodiments, the fluidity-enhancing metal may be present in the form of an oxide, halide, hydroxide, sulfide, sulfate, carbonate, phosphate, nitride, nitrite, nitride, carbide, boride, aluminide, telluride or a combination thereof.

Structure of Fluidity-Enhanced Welding Electrode

Figure 4A:
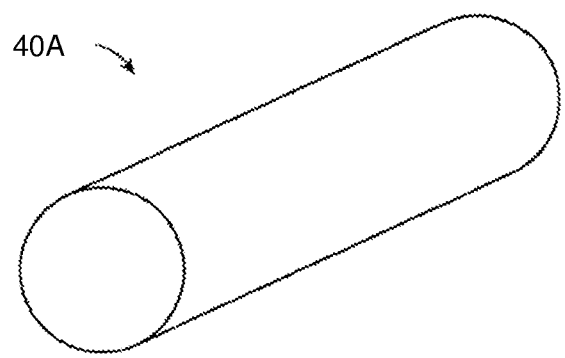
FIG. 4A is a schematic illustration of a solid welding wire having a fluid-enhancing metal alloyed therein to enhance molten weld metal fluidity, according to embodiments.

FIG. 4A is a schematic illustrations of a solid welding wire 40A configured to enhance weld metal fluidity, according to embodiments. In the illustrated embodiment, the fluidity-enhancing metal maybe alloyed with the base metal composition, e.g., to form a solid solution, such that the fluidity-enhancing metal as present may form metallic bonds with aluminum and other metal elements of the base metal composition as described above. In these embodiments, the consumable welding electrode is a solid wire comprising a homogenous solution or mixture, e.g., an alloy, formed by the base metal composition and the fluidity-enhancing metal.

Figure 4B:
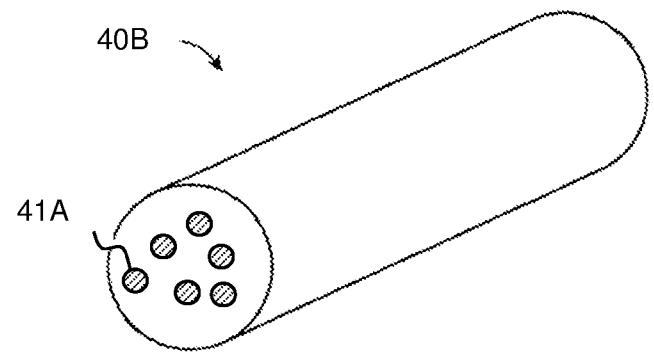
FIG. 4B is a schematic illustration of a solid welding wire having a fluid-enhancing metal compound mixed therein to enhance molten weld metal fluidity, according to embodiments.

FIG. 4B is a schematic illustrations of a solid welding wire 40B configured to enhance weld metal fluidity, according to some other embodiments. Unlike the solid welding wire 40A (FIG. 4A), in the embodiment illustrated in FIG. 4B, the fluidity-enhancing metal maybe be present in the form of a compound such as an oxide, halide, hydroxide, sulfide, sulfate, carbonate, phosphate, nitride, nitrite, nitride, carbide, boride, aluminide, telluride or a combination thereof. In these embodiments, the consumable welding electrode is a solid wire comprising a heterogenous mixture formed by the base metal composition and the compound of the fluidity-enhancing metal. The compound of the fluidity-enhancing metal may be present, e.g., in powder form that is dispersed within a matrix of the base metal composition.

Figure 4C:
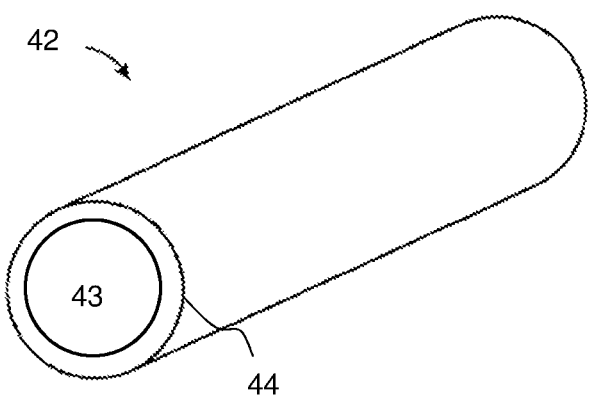
FIG. 4C is a schematic illustration of a coated solid welding wire configured to enhance molten weld metal fluidity, according to embodiments.
Figure 4D:
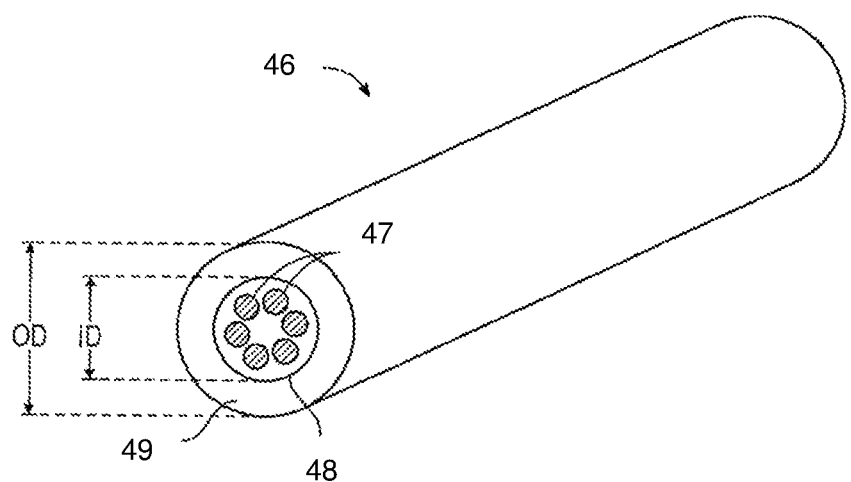
FIG. 4D is a schematic illustration of a cored welding wire configured to enhance molten weld metal fluidity, according to embodiments.

FIG. 4C is a schematic illustration of a coated solid welding wire 42 configured to enhance fluidity of the weld metal, according to embodiments. FIG. 4D is a schematic illustration of a cored welding wire 46 configured to enhance weld fluidity, according to embodiments. In these embodiments, the fluidity-enhancing metal may be chemically and/or physically separated from the base metal composition. For example, in the welding wire 42 (FIG. 4C), the fluidity-enhancing metal may be present as a coating 44 formed on the outer surface of a core wire 43 formed of the base metal composition. The coating 44 can include the fluid-enhancing metal in elemental, alloy or compound in a suitable form, e.g., a powder form. Alternatively, in the illustrated embodiment of FIG. 4D, the consumable welding wire 46 may be a cored wire comprising a core 48 and a sheath 49, wherein the core 48 comprises the fluidity-enhancing metal, e.g., in powder form 47, and the sheath 49 comprises the base metal composition.

Method of Enhancing Fluidity in Aluminum-Based Weld Metals

Figure 5:
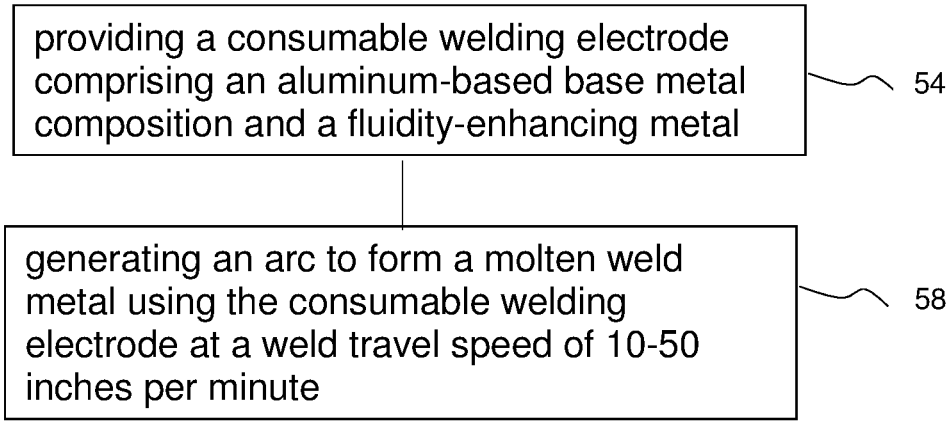
FIG. 5 is a flow chart illustrating a method of enhancing molten weld metal fluidity during aluminum welding, according to embodiments.

FIG. 5 is a flow chart illustrating a method of enhancing fluidity of the weld metal during aluminum welding, according to embodiments. The method includes providing 54 providing a consumable welding electrode comprising an aluminum-based base metal composition and a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd) or a combination thereof. The consumable welding electrode can be according to any one of the above-described embodiments. The method additionally includes generating 58 an arc to form a molten weld bead using the consumable welding electrode at a weld travel speed of 10-50 inches per minute. The fluidity-enhancing metal is present in form and an amount such that the molten weld metal has a fluidity that is higher relative to a molten weld metal formed under substantially the same welding conditions using the consumable welding electrode without the fluidity-enhancing metal. The method illustrated in FIG. 5 can be implemented in any suitable welding process, including gas-metal arc welding processes described below by way of example.

In gas-metal arc welding using solid (GMAW) or metal-cored electrodes (GMAW-C), a shielding gas is used to provide protection for the weld pool and the weld bead against atmospheric contamination during welding. When solid electrodes are used, they are appropriately alloyed with active ingredients that, in combination with the shielding gas, may be designed to enhance the weld metal fluidity as described above while also providing low porosity or porosity-free welds with the desired physical and mechanical properties of the resulting weld metal. When metal-cored electrodes are used, some of the active ingredients including a fluidity-enhancing metal may be added in the core of the cored wire, and designed to provide a similar function as in the case of solid electrodes.

Solid and metal-cored electrodes are designed to provide, under appropriate gas shielding, a solid, substantially porosity-free weld metal with yield strength, tensile strength, ductility and impact toughness to perform satisfactorily in the final applications. These electrodes may also be designed to minimize the quantity of slag generated during welding. For some applications, metal-cored electrodes can be used as an alternative to solid wires to increase productivity. As described herein, metal-cored electrodes refer to composite electrodes having a core that is at least partially filled and surrounded by a metallic outer sheath. The core can include metal powder and active ingredients to help with arc stability, weld wetting and appearance and desired physical and mechanical properties. The metal-cored electrodes are manufactured by mixing the ingredients of the core material and depositing them inside a formed strip, and then closing and drawing the strip to the final diameter. For some applications, cored electrodes can provide increased deposition rates and a wider, relatively consistent weld penetration profile compared to solid electrodes. As described herein, metal-cored electrodes (GMAW-C) refer to electrodes having a core whose ingredients are primarily metallic. When present, nonmetallic components in the core have a combined concentration less than 5%, 3% or 1%, on the basis of the total weight of each electrode. The relatively low nonmetallic components may distinguish GMAW-C electrodes from flux-cored arc welding electrodes described in more detail, infra. The GMAW-C electrodes can be characterized by a spray arc and high quality weld metal.

Similar to gas-metal arc welding using metal-cored electrodes (GMAW-C), electrodes used in flux-cored arc welding (FCAW, FCAW-S, FCAW-G) also include a core surrounded by a shell. That is, the cored electrodes used in flux-cored arc welding have a core that is at least partially filled and surrounded by a metallic outer sheath, similar to metal-cored electrodes described above. However, unlike metal-cored electrodes (GMAW-C), the cored electrodes used in flux-cored arc welding (FCAW) additionally includes fluxing agents designed to provide protection for the weld pool and the weld bead against atmospheric contamination during welding, at least partially in lieu of a shielding gas. The cored electrodes used in flux-cored arc can additionally include other active ingredients to help with arc stability, weld wetting and appearance and desired physical and mechanical properties. In one aspect, flux-cored arc electrodes may be distinguished from metal-cored electrodes by the amount of nonmetallic components present in the core, whose combined concentration can be less than 5%, 3% or 1%, on the basis of the total weight of each electrode.

A large number of fluxing agent compositions for flux-cored electrodes have been developed to control the arc stability, modify the weld metal composition, and to provide protection from atmospheric contamination. In flux-cored electrodes, arc stability may be controlled by modifying the composition of the flux. As a result, it may be desirable to have substances which serve well as plasma charge carriers in the flux mixture. In some applications, fluxes can also modify the weld metal composition by rendering impurities in the metal more easily fusible and providing substances with which these impurities may combine. Other materials are sometimes added to lower the slag melting point, to improve slag fluidity, and to serve as binders for the flux particles. Various wires used in FCAW may share some similar characteristics, e.g., forming a protective slag over the weld, using a drag angle technique, having the ability to weld out-of-position or flat and horizontal at higher deposition rates, having the ability to handle relatively higher amount of contaminants on the plate, etc. On the other hand, different types of flux-cored arc welding processes exist, namely: self-shielded flux-cored arc welding (FCAW-S) and gas-shielded flux-cored arc welding (FCAW-G).

Figure 6:
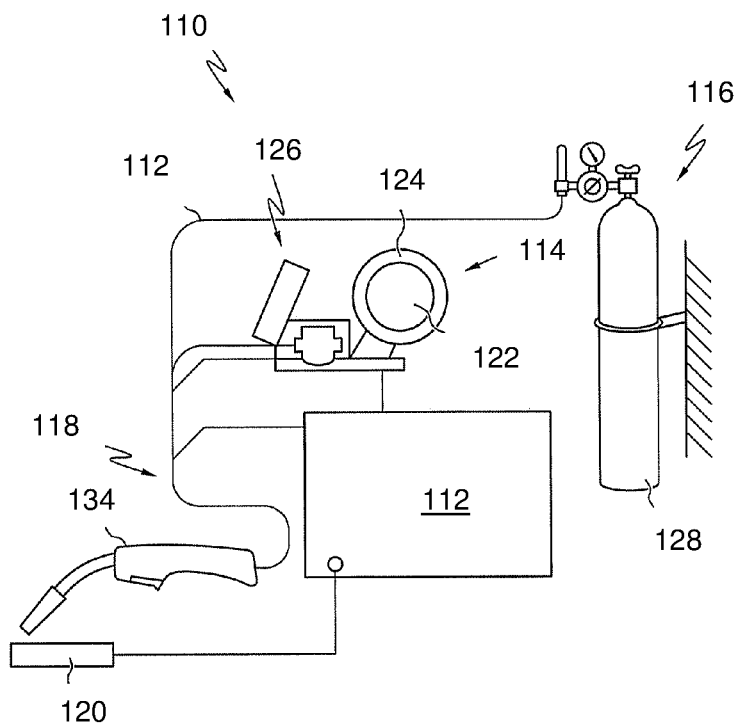
FIG. 6 illustrates a gas metal arc welding (GMAW) system adapted for welding aluminum using a welding wire configured to enhance molten weld metal fluidity, according to embodiments.

FIG. 6 schematically illustrates an example gas metal arc welding (GMAW) system 110 configured for aluminum-based welding wires according to embodiments. The GMAW system 110 includes an electrical power source 112, a wire drive assembly 114, a shielding gas supply system 116, and a cable assembly 118 for delivering electrical power, a welding wire in a spool 124 and a shielding gas in a shield gas source 128 configured to be delivered to a workpiece 120 to be welded. The wire drive assembly 114 typically includes a reel stand 122 for carrying the spool 124 including a continuous consumable wire electrode as well as a drive mechanism 126 including one or more drive wheels (not shown) for driving the welding wire from the spool 124 through the cable assembly 118 to the workpiece 120. The shielding gas supply system 116 normally includes a shielding gas source 128 and a gas supply conduit 130 in fluid communication with cable assembly 118. As illustrated in FIG. 6, the cable assembly 118 typically includes an elongated flexible cable 132 attached on one end to the power source 112, the wire drive assembly 114 and the gas supply system 116, and on the other end to a weld gun 134.

ADDITIONAL EXAMPLES

1. A consumable welding electrode, comprising:
a base metal composition comprising at least 70% by weight of aluminum; and
a fluidity-enhancing metal capable of forming a binary eutectic composition with aluminum, wherein the binary eutectic composition undergoes a binary eutectic solidification at a eutectic temperature lower than a melting temperature of pure aluminum by less than 90° C.,
wherein the fluidity-enhancing metal is present in form and an amount such that a weld metal formed from the consumable welding electrode has one or more of the following, relative to a weld metal formed under substantially the same welding conditions using the consumable welding electrode without the fluidity-enhancing metal:
a weld metal height (H) that is lower by at least 5%,
a weld metal width (W) that is higher by at least 5%,
a H/W ratio that is lower by at least 5%,
a penetration (P) that is lower by at least 5%, and
a weld toe angle (q) that is lower by at least 5%.

2. A consumable welding electrode, comprising:
a base metal composition comprising at least 70% by weight of aluminum; and
a fluidity-enhancing metal capable of forming a binary eutectic composition with aluminum, wherein the binary eutectic composition undergoes a binary eutectic solidification at a eutectic temperature lower than a melting temperature of pure aluminum by less than 90° C.,
wherein the fluidity-enhancing metal is present in form and an amount such that a molten weld metal formed from the consumable welding electrode has a fluidity that is higher by at least 5% relative to a molten weld metal formed under substantially the same welding conditions using the consumable welding electrode without the fluidity-enhancing metal.

3. A consumable welding electrode, comprising:
a base metal composition comprising at least 70% by weight of aluminum; and
a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd) or a combination thereof,
wherein the fluidity-enhancing metal is present in an amount greater than 0.05% and less than or equal to a binary eutectic composition by weight on the basis of a combined weight of aluminum and the fluidity enhancing metal.

4. A consumable welding electrode, comprising:
a base metal composition comprising at least 70% by weight of aluminum; and
a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd) or a combination thereof,
wherein the fluidity-enhancing metal is present in form and an amount such that a molten weld metal formed from the consumable welding electrode has a fluidity that is higher by at least 5% relative to a molten weld metal formed under substantially the same welding conditions using the consumable welding electrode without the fluidity-enhancing metal.

5. A consumable welding electrode, comprising:
a base metal composition comprising at least 70% by weight of aluminum; and
a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd) or a combination thereof,
wherein the fluidity-enhancing metal is present in form and an amount such that a weld metal formed from the consumable welding electrode has one or more of the following, relative to a weld metal formed under substantially the same welding conditions using the consumable welding electrode without the fluidity-enhancing metal:
a weld metal height (H) that is lower by at least 5%,
a weld metal width (W) that is higher by at least 5%,
a H/W ratio that is lower by at least 5%,
a penetration (P) that is lower by at least 5%, and
a weld toe angle (q) that is lower by at least 5%.

6. The consumable welding electrode of any of the above Embodiments, wherein the fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd) or a combination thereof is present in an amount greater than 0.1% and less than or equal to the eutectic composition by weight on the basis of a combined weight of aluminum and the fluidity enhancing metal.

7. The consumable welding electrode of any of the Embodiments, wherein the fluidity-enhancing metal is capable forming a binary eutectic composition with aluminum, wherein the binary eutectic composition undergoes a binary eutectic solidification at a eutectic temperature of 570-660° C.

8. The consumable welding electrode of any of the above Embodiments, wherein the fluidity-enhancing metal is present in form and an amount such that a molten weld metal formed from the consumable welding electrode has a fluidity that is higher by at least 10% relative to a molten weld metal formed using the base metal composition without the fluidity-enhancing metal.

9. The consumable welding electrode of any one of the above embodiments, wherein the base metal composition further comprises one or both of silicon (Si) and magnesium (Mg) as alloying elements for alloying with aluminum in the weld metal bead formed using the consumable welding electrode.

10. The consumable welding electrode of any of the above Embodiments, wherein a solidified weld metal formed from the consumable welding electrode has a yield strength and/or tensile strength that is higher or within 10% of a yield strength and/or tensile strength of a solidified weld metal formed using the base metal composition without the fluidity-enhancing metal.

11. The consumable welding electrode of any one of the above Embodiments, wherein the fluidity-enhancing metal is present in elemental metal form.

12. The consumable welding electrode of any one of the above Embodiments, wherein the fluidity-enhancing metal is present in a compound selected from an oxide, a halide, a hydroxide, a sulfide, a sulfate, a carbonate, a phosphate, a nitrate, a nitrite, a nitride, a carbide, a boride, an aluminide, a telluride or a combination thereof.

13. The consumable welding electrode of any one of the above Embodiments, wherein the welding electrode is configured for welding at a weld travel speed of 10-50 inches per minute under a welding condition.

14. The consumable welding electrode of any one of the above Embodiments, wherein the welding electrode is configured for a gas metal arc welding (GMAW).

15. The consumable welding electrode of any one of the above Embodiments, wherein the consumable welding electrode comprises a core wire comprising the base metal composition and a coating comprising the fluidity-enhancing metal surrounding the core wire.

16. The consumable welding electrode of any one of Embodiments 1-14, wherein the consumable welding electrode is a cored wire comprising a core and a sheath, wherein the core comprises the fluidity-enhancing metal and the sheath comprises the base metal composition.

17. The consumable welding electrode of any one of Embodiments 1-14, wherein the consumable welding electrode is solid wire comprising a homogenous mixture of the base metal composition and the fluidity-enhancing metal.

18. A method of welding an aluminum workpiece, comprising:
providing a consumable welding electrode comprising an aluminum-based base metal composition and a fluidity-enhancing metal selected from the group consisting of nickel (Ni), gold (Au), calcium (Ca), strontium (Sr), scandium (Sc), yttrium (Y), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd) or a combination thereof; and
generating an arc to form a molten weld metal using the consumable welding electrode at a weld travel speed of 10-50 inches per minute,
wherein the fluidity-enhancing metal is present in form and an amount such that the molten weld metal has a fluidity that is higher relative to a molten weld metal formed under substantially the same welding conditions using the consumable welding electrode without the fluidity-enhancing metal.

19. The method of welding according to Embodiment 18, wherein the consumable welding wire is according to any one of Embodiments 1-17.

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or whether these features, elements and/or states are included or are to be performed in any particular embodiment.

While certain embodiments have been described, these embodiments have been presented by way of example only, and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. Any suitable combination of the elements and acts of the various embodiments described above can be combined to provide further embodiments. The various features and processes described above may be implemented independently of one another, or may be combined in various ways. All possible combinations and subcombinations of features of this disclosure are intended to fall within the scope of this disclosure.

What is claimed is:

1. A consumable welding electrode, comprising:
    a base metal composition comprising at least 70% by weight of aluminum; and
    a second metal capable of forming a binary eutectic with aluminum, wherein the binary eutectic undergoes a binary eutectic solidification at a eutectic temperature of 595-660° C.,
    wherein the second metal is present in a form and at a hypoeutectic concentration greater than 0.05 weight % and up to 0.5 weight % such that a solidification temperature range of a molten weld metal formed by melting the consumable welding electrode is less than 65° C.

2. The consumable welding electrode of claim 1, wherein the binary eutectic undergoes a binary eutectic solidification at a eutectic temperature >595 and <630° C.

3. The consumable welding electrode of claim 2, wherein the second metal is selected from the group consisting of calcium (Ca) and lithium (Li), or a combination thereof.

4. The consumable welding electrode of claim 1, wherein the binary eutectic undergoes a binary eutectic solidification at a eutectic temperature ≥630 and <645° C.

5. The consumable welding electrode of claim 4, wherein the second metal is selected from the group consisting of nickel (Ni) and yttrium (Y), or a combination thereof.

6. The consumable welding electrode of claim 1, wherein the binary eutectic undergoes a binary eutectic solidification at a eutectic temperature ≥645 and ≤660° C.

7. The consumable welding electrode of claim 6, wherein the second metal is selected from the group consisting of gold (Au), strontium (Sr), iron (Fe), cadmium (Cd), or a combination thereof.

8. The consumable welding electrode of claim 1, wherein a weld metal formed from the consumable welding electrode has one or more of the following, relative to a weld metal formed under substantially the same welding conditions using a consumable welding electrode that has the same base metal composition without the second metal:
    a weld metal height (H) that is lower by at least 5%,
    a weld metal width (W) that is higher by at least 5%,
    a H/W ratio that is lower by at least 5%,
    a penetration (P) that is lower by at least 5%, and
    a weld toe angle (q) that is lower by at least 5%.

9. The consumable welding electrode of claim 1, wherein the second metal is present in elemental form or forms a metal alloy with an element of the base metal.

10. The consumable welding electrode of claim 1, wherein the second metal is present in the form of a compound selected from an oxide, a halide, a hydroxide, a sulfide, a sulfate, a carbonate, a phosphate, a nitrite, a nitride, a carbide, a boride, an aluminide, a telluride or a combination thereof.

11. The consumable welding electrode of claim 10, wherein the second metal is present in the form of an oxide or a hydroxide.

12. The consumable welding electrode of claim 1, wherein the second metal is present in form and a hypoeutectic concentration such that a molten weld metal formed from the consumable welding electrode has a fluidity that is higher by at least 5% relative to a molten weld metal formed under substantially the same welding conditions using a consumable welding electrode that has the same base metal composition without the second metal.

13. The consumable welding electrode of claim 1, wherein the second metal is selected from the group consisting of scandium (Sc), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd), or a combination thereof.

14. A consumable welding electrode, comprising:
    a base metal composition comprising at least 70% by weight of aluminum; and
    a second metal capable of forming a binary eutectic with aluminum, wherein the binary eutectic undergoes a binary eutectic solidification at a eutectic temperature of 595-660° C.,
    wherein the second metal is present at a hypoeutectic concentration and in the form of a compound selected from an oxide, a halide, a hydroxide, a sulfide, a sulfate, a carbonate, a phosphate, a nitrite, a nitride, a carbide, a boride, an aluminide, a telluride or a combination thereof.

15. The consumable welding electrode of claim 14, wherein the second metal is selected from the group consisting of nickel (Ni), gold (Au), calcium (Ca), strontium (Sr), yttrium (Y), lithium (Li), iron (Fe), cadmium (Cd), or a combination thereof.

16. The consumable welding electrode of claim 15, wherein the binary eutectic undergoes a binary eutectic solidification at a eutectic temperature >595 and <630° C.

17. The consumable welding electrode of claim 16, wherein the second metal is selected from the group consisting of calcium (Ca) and lithium (Li), or a combination thereof.

18. The consumable welding electrode of claim 15, wherein the binary eutectic undergoes a binary eutectic solidification at a eutectic temperature ≥630 and <645° C.

19. The consumable welding electrode of claim 18, wherein the second metal is selected from the group consisting of nickel (Ni), yttrium (Y), or a combination thereof.

20. The consumable welding electrode of claim 15, wherein the binary eutectic undergoes a binary eutectic solidification at a eutectic temperature ≥645 and ≤660° C.

21. The consumable welding electrode of claim 20, wherein the second metal is selected from the group consisting of gold (Au), strontium (Sr), iron (Fe), cadmium (Cd), or a combination thereof.

22. The consumable welding electrode of claim 15, wherein the second metal is present in a hypoeutectic concentration of 0.05-0.5 weight % such that a solidification temperature range of a molten weld metal formed by melting the consumable welding electrode is less than 65° C.

23. The consumable welding electrode of claim 15, wherein the base metal composition further comprises one or both of silicon (Si) and magnesium (Mg) as alloying elements for alloying with aluminum in the weld metal formed using the consumable welding electrode.

24. The consumable welding electrode of claim 14, wherein the second metal is selected from the group consisting of scandium (Sc), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd), or a combination thereof.

25. A consumable welding electrode, comprising:
a base metal composition comprising at least 70% by weight of aluminum; and
a second metal capable of forming a binary eutectic with aluminum, wherein the binary eutectic undergoes a binary eutectic solidification at a eutectic temperature of 595-660° C.,
wherein the second metal is present in form and at a hypoeutectic concentration such that a molten weld metal formed from the consumable welding electrode has a fluidity that is higher by at least 5% relative to a molten weld metal formed under substantially the same welding conditions using a consumable welding electrode that has the same base metal composition without the second metal.

26. The consumable welding electrode of claim 25, wherein the hypoeutectic concentration is such that the molten weld metal formed from the consumable welding electrode solidifies into a single phase having the aluminum crystal structure.

27. The consumable welding electrode of claim 26, wherein the second metal is present in an amount of 0.05-0.50 weight %.

28. The consumable welding electrode of claim 25, wherein the second metal is present in the form of a compound selected from an oxide, a halide, a hydroxide, a sulfide, a sulfate, a carbonate, a phosphate, a nitrite, a nitride, a carbide, a boride, an aluminide, a telluride or a combination thereof.

29. The consumable welding electrode of claim 25, wherein the second metal is selected from the group consisting of nickel (Ni), gold (Au), calcium (Ca), strontium (Sr), yttrium (Y), lithium (Li), iron (Fe), cadmium (Cd), or a combination thereof.

30. The consumable welding electrode of claim 29, wherein the binary eutectic undergoes a binary eutectic solidification at a eutectic temperature >595 and <630° C.

31. The consumable welding electrode of claim 30, wherein the second metal is selected from the group consisting of calcium (Ca), lithium (Li) or a combination thereof.

32. The consumable welding electrode of claim 29, wherein the binary eutectic undergoes a binary eutectic solidification at a eutectic temperature ≥630 and <645° C.

33. The consumable welding electrode of claim 32, wherein the second metal is selected from the group consisting of nickel (Ni), and yttrium (Y), or a combination thereof.

34. The consumable welding electrode of claim 29, wherein the binary eutectic undergoes a binary eutectic solidification at a eutectic temperature ≥645 and ≤660° C.

35. The consumable welding electrode of claim 34, wherein the second metal is selected from the group consisting of gold (Au), strontium (Sr), iron (Fe), cadmium (Cd) or a combination thereof.

36. The consumable welding electrode of claim 25, wherein the base metal composition further comprises one or both of silicon (Si) and magnesium (Mg) as alloying elements for alloying with aluminum in the weld metal formed using the consumable welding electrode.

37. The consumable welding electrode of claim 25, wherein the consumable welding electrode is a coated electrode comprising a core wire comprising the base metal composition and a coating comprising the second metal surrounding the core wire.

38. The consumable welding electrode of claim 25, wherein the consumable welding electrode is a cored wire comprising a core and a sheath, wherein the core comprises the second metal and the sheath comprises the base metal composition.

39. The consumable welding electrode of claim, 25, wherein the consumable welding electrode is solid wire comprising a homogenous mixture of the base metal composition and the second metal.

40. The consumable welding electrode of claim 25, wherein the second metal is selected from the group consisting of scandium (Sc), terbium (Tb), europium (Eu), cerium (Ce), praseodymium (Pr), ytterbium (Yb), holmium (Ho), erbium (Er), lanthanum (La), dysprosium (Dy), samarium (Sm), lutetium (Lu), thulium (Tm), neodymium (Nd), gadolinium (Gd), or a combination thereof.

* * * * *